3,014,836
CALCINED CLAY PRODUCTS
William J. Proctor, Jr., Gordon, Ga., assignor to Southern Clays, Inc., Gordon, Ga., a corporation of Georgia
No Drawing. Filed May 1, 1957, Ser. No. 656,198
5 Claims. (Cl. 162—181)

My invention relates to new and improved low-abrasion, calcined, unmilled and milled clay or kaolin powders and to a new and improved method of making the same. The invention includes the new and improved powders, irrespective of the method of making the same. The invention includes the calcined powders in both the milled and unmilled form, for use for every purpose.

The improved low-abrasion calcined powders have greater brightness and whiteness, opacity and covering power and wetting power than the purified, uncalcined clay or kaolin powder which is used as the starting material.

Brightness and whiteness are measured by a well-known instrument which is made by General Electric Company. The value of brightness and whiteness, as measured by said instrument, is conveniently designated as the "GE" value. In said instrument, the brightness and whiteness of magnesium oxide, MgO, is given a "GE" value of 100. Thus, a purified, dry, uncalcined, filler clay powder which is later described, has a brightness and whiteness of 80% to 81% of the brightness and whiteness of magnesium oxide. Said uncalcined, filler clay powder has a "GE" value of 80 to 81. The improved calcined, low-abrasion powders, either unmilled or milled, have a minimum "GE" value of substantially 90, and said "GE" value may be in a range of 90 to 91, and as high as 93. The "GE" value of the improved, low-abrasion, calcined, unmilled or milled clay or kaolin powder, may thus be substantially equal to the "GE" value of the much more expensive titanium dioxide powder, which is used as a white pigment and for other purposes. This well-known white titanium dioxide powder is described, for example, in page 316 of "Handbook of Cosmetic Materials" by Greenberg and Lester, published in 1954 by Interscience Publishers, Inc.

All abrasion values mentioned herein are determined by the method later stated herein.

As a preliminary comparison, a calcined kaolin powder has been sold for at least twelve years under the name of "Whitetex." This has been made from said uncalcined, filler clay powder by the method described herein. This "Whitetex" has had an average high abrasion value of 500 to 700. As a convenient comparison, the abrasion value of said uncalcined, filler clay powder is 20 to 35, and the abrasion value of said titanium dioxide powder is 38 to 43.

The improved, low-abrasion, calcined clay or kaolin powders, unmilled or milled, in addition to improved whiteness and brightness and opacity and covering power and wetability by water and other materials as compared with the uncalcined starting material, has a low-abrasion value of zero up to a maximum of two hundred or substantially two hundred.

Said "Whitetex" has a "GE" value of 90 to 91.

However, the high-abrasion value of 500 to 700 of said "Whitetex" has greatly restricted its use.

If said "Whitetex" is used as a clay filler or as a substitute for such clay filler in making a paper web in the well-known Fourdrinier machine, the high abrasion of the "Whitetex," if used alone or in substantial ratio, rapidly wears the expensive wire fabric of such machine, so that it is necessary to stop the machine, in order to replace its wire. This results in loss of production, in addition to the expense of replacing the expensive wire. A paper web made with "Whitetex" filler or with "Whitetex" as a substantial part of said filler, rapidly dulls the knives which are used to cut the paper web into sheets. If "Whitetex" is used as a coating mineral pigment on paper or as a substantial part of said coating pigment, the high abrasion of "Whitetex" rapidly wears certain types of printing plates, thus resulting in imperfect printing. Hence the use of said "Whitetex" in the paper industry has been insignificant. These disadvantages of "Whitetex" have been known for at least twelve years, without overcoming said disadvantages.

Also, "Whitetex" has the additional disadvantage of high clay-water viscosity in an aqueous deflocculated slurry thereof, which is highly undesirable in making a mineral coating composition in the paper industry. In making a mineral coating composition for coating paper, an aqueous, alkaline slurry of the deflocculated mineral pigment or mineral pigments is made; and a separate aqueous solution or dispersion of the adhesive is made. Said aqueous slurry of the deflocculated mineral pigment or pigments is mixed with the aqueous solution or dispersion of the adhesive. For this mixing purpose, the aqueous slurry of the deflocculated clay pigment should have low viscosity. The respective viscosity of said aqueous slurry is designated as the clay-water viscosity of the respective clay.

All viscosity values stated herein are measured by the well-known "Stormer" viscosimeter. This viscosimeter is described in "Industrial and Engineering Chemistry," vol. 34, page 163, published in February 1942; and in "Drugs, Oils and Paints," vol. 27, No. I, page 18, published in 1911. This "Stormer" viscosimeter has a vertical spindle, which has vanes or paddles which are immersed in the medium whose viscosity is being tested. A rotating force is applied to said spindle by means of a selected weight. If the medium is too viscous to permit the spindle to rotate under the force of said weight, this high viscosity is designated as "N.C." If the spindle is rotated by the weight, the time for one hundred rotations of the spindle is observed in seconds, as the measurement of the viscosity of the medium. If 15 seconds are required for 100 rotations of the spindle, the viscosity is designated as "15 seconds."

In the viscosity values stated herein, a test aqueous slurry was made which had 70 parts by weight of the respective clay or kaolin, and 30 parts of an aqueous, alkaline solution of a deflocculating agent. The viscosity of this deflocculated test slurry is designated as viscosity at 70% solids. As two examples, the clay-water viscosity of such slurry of uncalcined filler clay, and of the uncalcined coating clay whihc is later described, is 15 seconds at 70% solids.

Said "Whitetex" has a high "N.C." viscosity at 70% solids.

As another disadvantage of said "Whitetex," it requires a large proportion of casein or other adhesive or mixed adhesive, in making a mineral coating on paper, in order to secure good adhesion of said coating to the paper. Since the adhesive is the most expensive ingredient of the mineral coating composition, this has further limited the use of "Whitetex" in the paper industry.

The adhesiveness of a dry, finished mineral coating on paper to the paper, is measured by a well-known test, which uses waxes known as "Dennison" waxes, which are arranged in a series which are identified by respective consecutive numbers. In the tests used herein, No. 6 "Dennison" wax was used. If the adhesion of the mineral coating to the No. 6 "Dennison" wax exceeds the adhesion of said mineral coating to the paper, said mineral coating is removed or "picked" from the paper by said No. 6 "Dennison" wax. The test with these "Dennison" waxes is described as "Test Method T 459 M48," in "Testing Methods, Recommended Practices and Specifications of the Pulp and Paper Industry."

As one preliminary example, if said "Whitetex" is used as the sole mineral coating pigment in a mineral coating on paper, using a conventional coating composition in which casein is the sole adhesive, from 25 to 35 parts by weight of casein per 100 parts of "Whitetex" are required to resist the removal of the dry, finished coating by No. 6 "Dennison" wax.

The corresponding casein demand of the uncalcined, clay coating powder which is later described, which has been extensively used as a mineral pigment in a coating on paper, is only 10 to 12 parts by weight of casein, per 100 parts of said coating clay.

Low clay-water viscosity and low adhesive requirement are immaterial properties for many purposes, so that the invention is not limited to a low-abrasion, calcined clay or kaolin powder which has either low clay-water viscosity or low adhesive demand, or both of these properties.

A low-abrasion, calcined, clay or kaolin powder which has a minimum "GE" value of substantially 90 and a maximum abrasion value of 200 or substantially 200, is suitable for many purposes, such as a filler or part of a filler in paper and for use as a filler or part of a filler in other materials, such as natural rubber, synthetic rubbers, elastomers in general and in plastics; and for use as a pigment for many purposes, even though said powder has high clay-water viscosity and high adhesive demand.

In using the low-abrasion, calcined, milled or unmilled clay or kaolin powder in the paper industry, this may be mixed in suitable ratio with a low-abrasion extender or diluent, such as purified, uncalcined clay or kaolin, in order not to exceed the critical abrasiveness of the wire of the Fourdrinier machine, or other critical factor. In any event, the greater abrasiveness of the milled or unmilled low-abrasion calcined clay powder, as compared with the abrasiveness of clay or kaolin which is substantially free from abrasive impurities, is more than compensated by superior brightness and whiteness, superior opacity, superior covering power, and superior wettability by water and by many materials and compositions in which the low-abrasive calcined powder is used as a filler or for other purpose.

When the improved, low-abrasion, calcined powder has high clay-water viscosity and high casein or other adhesive demand, it can, as an additional optional improvement, be milled or otherwise frictionally worked, dry or wet, in order to decrease said clay-water viscosity and the casein or other adhesive demand. As one example, such low-abrasion, calcined powder, if it has high clay-water viscosity and high adhesive demand, can be milled or otherwise frictionally worked, dry or wet, until its clay-water viscosity in this example is 15 seconds at 70% solids, or is a maximum of 18 seconds at 70% solids. This operation also lowers the demand for casein or other adhesive. The milling or other frictional working may be done optionally without substantially changing the original average particle size, original brightness and whiteness, and original abrasion value of the original unmilled, calcined clay or kaolin powder, although the milling results in some increase of fine or small calcined particles. Hence the milling or other frictional working results essentially or largely in some type of surface action on the unmilled calcined particles. This improvement in clay-water viscosity and adhesive demand of the low-abrasion or high-abrasion calcined clay or kaolin, without substantially changing original average particle size, original brightness and whiteness, and original abrasive value of the low abrasion or high-abrasion calcined powder prior to milling, is one of the discoveries of my invention.

As later described, the original, calcined kaolin or clay powders are made by calcining clay or kaolin which is substantially free from abrasive impurities, to produce initial large calcined abrasive clumps, and then pulverizing said calcined clumps. The low-abrasion calcined powders preferably have 80% or more by weight of a particle size below two microns.

The relation between the abrasiveness of a powder and its particle size does not follow a fixed rule.

Thus, as stated in page 311 of a text-book entitled "Cosmetics" by Ralph G. Harry, published in 1956 by Chemical Publishing Co., Inc., the diameter of the particles of dicalcium phosphate can be varied over a wide range without producing any substantial increased abrasiveness.

I have discovered that when uncalcined clay or kaolin powder which is substantially free from abrasive impurities, is calcined to produce large, calcined, abrasive clumps, as later described, and said clumps are then pulverized as later described, the abrasive value of the resultant, entire, calcined powder depends upon its calcined particle size.

I have also discovered that the particle size of the original, entire calcined powder which is thus made, depends upon the particle size of the purified, uncalcined clay or kaolin powder starting material.

As one example, I use a very fine grade of uncalcined clay or uncalcined kaolin powder which is substantially free from abrasive impurities. In this very fine grade, 90% or more by weight has a particle size below two microns. In one example later stated herein in Table No. 7, substantially 96% by weight of this fine grade of clay or kaolin powder has a particle size below two microns. I calcine this very fine grade of clay or kaolin powder as later described to produce calcined clumps, and I pulverize or otherwise comminute these calcined clumps to produce an entire, resultant, low-abrasion calcined powder in which more than 80% by weight has a particle size below two microns, and in which the abrasion value is a maximum of 200 or a maximum of substantially 200, as stated in Table No. 8, later described. This original, entire low-abrasion calcined powder, as described in said Table No. 8, has high clay-water viscosity and high adhesive demand. Due to its low-abrasion, this original, entire calcined powder can be used without milling, as a filler or part of a filler in making paper and for many other purposes.

As an additional optional improvement, said entire low-abrasion calcined powder can be milled or otherwise frictionally worked, until, as one example, the resultant milled powder has the properties defined in the following Table No. 9.

As previously noted, and in all cases in which milling or other frictional working is used to lower clay-water viscosity and adhesive demand, the milled and unmilled calcined powder may be substantially the same in average particle size, in brightness and whiteness, in abrasive value, and in opacity and covering power and wetting power and other important factors, although there is some increase in the amount of fine particles.

In other cases, as when the starting material is said uncalcined filler clay as one example, in which only about 70% by weight of the uncalcined clay particles have a size below two microns, and I calcine and then pulverize said filler clay as later described, the original, entire, calcined powder is said high-abrasion calcined "Whitetex." In such case, I can mill or otherwise frictionally work the said original, entire, high-abrasion calcined "Whitetex" powder until the clay-water viscosity of the entire milled, calcined powder is 15 seconds at 70% solids, as one example, without substantially changing the original average particle size of the original, unmilled, calcined "Whitetex" or its original high-abrasion value, or its original brightness and whiteness, although the amount of fine calcined particles is somewhat increased. After milling the "Whitetex," I then separate a low-abrasion, fine-particle, calcined milled fraction from said high-abrasion, calcined, milled "Whitetex."

Said low-abrasion, milled, calcined fraction has at least 80% by weight of a particle size below two microns.

In every case in which an unmilled, calcined clay or kaolin powder has high abrasion above the maximum low-abrasion value of 200 or substantially 200, and said unmilled, calcined powder has a low-abrasion, calcined fraction whose maximum abrasion value is 200 or substantially 200, I can first mill said high-abrasion, calcined powder until its maximum clay-water viscosity is 18 seconds or 15 seconds as one example, and then fractionate said calcined, milled powder to separate a fine-particle, low-abrasion, milled, calcined fraction therefrom, as one of the end-products of my invention.

As an alternative, I can first separate a fine-particle, low-abrasion, unmilled, calcined fraction from said original, entire, unmilled, calcined, high-abrasion "Whitetex" or other unmilled, calcined, high-abrasion clay or kaolin calcined powder. This low-abrasion, unmilled, calcined fraction has at least 80% by weight of particles whose size is below two microns. This low-abrasion, unmilled, calcined fraction may be used without milling or other frictional working for many purposes, even though it has high clay-water viscosity and high adhesive demand, or said low-abrasion, unmilled, calcined fraction may be milled or otherwise frictionally worked without substantially changing its original average particle size, its original brightness and whiteness, and its original low abrasive value, until its clay-water viscosity may be 15 seconds at 70% solids, and the adhesive demand is also decreased. As above noted, the milling increases the amount of fine particles to some extent.

Whenever particle size is mentioned herein, said particle size is determined by an approximate method which is used in the paper industry, and which is later described. Due to different methods used in determining particle size in the paper industry, and due to inevitable experimental error, whenever a particle size below two microns is mentioned in any part of this disclosure this includes a particle size up to two and two-tenths microns or substantially two and two-tenths microns.

The invention includes paper in which the low-abrasion, calcined, milled or unmilled kaolin or clay powder is used as a filler or as any part of the filler. For many purposes, it is desirable to make paper which has a mixed filler which includes the low-abrasion, calcined, milled or unmilled kaolin or clay powder, and also has an uncalcined kaolin or clay powder, such as the well-known uncalcined clay filler. If said low-abrasion, calcined, kaolin or clay powder is only part of the total filler in paper, the minimum percentage of weight of said calcined powder may be 16% of the total filler in the paper. This minimum ratio may be 50% by weight.

The use of said calcined low-abrasion clay or kaolin powder, either as the total filler in paper, or in sufficient ratio in said total filler, results in an improved paper. This improved paper has improved brightness, whiteness and opacity, in comparison with the same paper in which the total filler is commercial filler clay, used in the same ratio by weight of the paper.

In some cases, as in thin cigarette paper, the weight of the clay filler is only about 2% to 3% of the weight of the paper. In such case, the entire filler may be said low-abrasion, calcined clay or kaolin powder, milled or unmilled. The invention includes all paper which has said low-abrasion, calcined filler, irrespective of the ratio by weight of the total filler to the paper.

The invention also includes all paper which has a mineral pigment coating, in which the low-abrasion, calcined clay or kaolin powder is the entire mineral pigment of the coating, or any part of said entire mineral pigment. If the low-abrasion clay or kaolin powder is used as a mineral pigment or part thereof in a coating on paper, said powder is preferably a milled powder, in order to get low clay-water viscosity and low adhesive requirement. The improved, low-abrasion calcined powder may be a part of the total mineral pigment in such mineral coating, and the remainder of said mineral pigment may be uncalcined kaolin or clay coating powder which is later described. Preferably, at least 16% by weight of the total mineral pigment in such coating consists of said low-abrasion, calcined powder. This minimum ratio may be 50%.

In order to use the average crude, uncalcined clay or kaolin for the purposes herein, it is necessary first to substantially purify or clean said crude kaolin from sand, quartz, mica, and other abrasive impurities.

*Purifying the crude clay or kaolin from abrasive impurities such as sand, mica, quartz*

This can be done by a well-known process, which does not require detailed description. The invention is not limited to this method of purification.

In general, the uncalcined, crude starting material is crushed and mixed with an alkaline, aqueous solution of a dispersing or deflocculating agent, in order to form an alkaline aqueous slurry of the deflocculated clay or kaolin, from which the abrasive impurities settle by sedimentation, leaving the uncalcined, purified or cleaned clay or kaolin particles suspended in deflocculated form in the cleaned slurry. As one example, the cleaned, suspended, deflocculated clay particles may be the filler clay described herein, in which about 70% by weight of the particles have a size below two microns.

If it is desired to provide a cleaned, uncalcined clay, in which more than 70% by weight has a particle size below two microns, such as the uncalcined coating clay later described, the cleaned alkaline slurry and its suspended, deflocculated clay particles may be, as one process, flowed into a tank, in which the cleaned alkaline slurry is allowed to stand without agitation, until the larger particles of uncalcined, deflocculated clay are separated from the alkaline slurry by sedimentation, while the smaller clay particles remain suspended. This method is described in Maloney U.S. Patent No. 2,158,-987, dated May 16, 1939, entitled "Clay Product and Process of Preparing Same." Hence the final cleaned slurry may have uncalcined, suspended, deflocculated clay particles in which any part by weight such as 80% or more, thereof has a particle size below two microns.

The respective uncalcined, cleaned clay or kaolin is collected from the respective cleaned alkaline slurry by various well-known collection methods.

In one well-known method, the cleaned alkaline slurry, after being separated from the removed particles, is acidified. The acidifying agent may be alum, or other acidic agent. A bleaching agent may be used to bleach and whiten the clay.

The acidification flocculates the suspended clay particles and forms flocculated aggregates of the respective, uncalcined cleaned clay or kaolin particles. These flocculated aggregates are separated from the water of the acidified slurry by filtration, and the filtered, uncalcined aggregates are dried, and then pulverized to form a dry, uncalcined powder which is used for calcination as later described. The particles of said dry, uncalcined, collected powder are considered for the purposes herein, as having the same ultimate particle size as the respective cleaned, uncalcined, deflocculated clay particles which remain suspended in the respective cleaned, alkaline slurry.

Said Maloney process or other fractionating process may also be used to separate a fine-particle, low abrasion calcined fraction from an original, entire high-abrasion calcined powder, either before milling said original, entire, high-abrasion calcined powder or after milling said original, entire, high-abrasion calcined powder.

I have discovered that in fractionating a high-abrasion, calcined, milled or unmilled powder by said Maloney process in order to separate a small-particle, low-abrasion calcined clay fraction, it is preferable to make an alkaline deflocculated slurry of the milled or unmilled high-abrasion, calcined powder which has from substantially 15 to 30 parts of calcined clay solids by weight, so that the alkaline water of said slurry is from 70 to 85 parts by weight. The calcined, large-particle, high-abrasion clay fraction is separated by sedimentation, and the suspended, calcined, small-particle, low-abrasion clay fraction is collected as above described, or by any other method.

The invention is further explained below. In these examples, to which the invention is not limited, the starting material was uncalcined and cleaned Georgia kaolin as set forth in page 380 of the 1942 edition of "Condensed Chemical Dictionary," published by Reinhold Publishing Corporation. Since kaolin is a natural product, its composition has some variations, and the entire disclosure herein is subject to routine variations, depending upon the uncalcined kaolin which is used as the starting material, and upon other factors.

As one example, the starting material is the cleaned or purified, uncalcined clay powder of the grade which is well-known commercially in the paper industry as filler clay.

The average properties of uncalcined, commercial filler clay powder are substantially as follows:

TABLE NO. I.—UNCALCINED FILLER CLAY POWDER

Particle size: 70% by weight has a particle size below two microns.
"GE" value: 80 to 81.
Abrasion value: 20 to 35.
Clay-water viscosity: 15 seconds at 70% solids.
Casein demand: 10 to 12 parts of casein per 100 parts of said filler clay. As above noted, the test is made by No. 6 "Dennison" wax, whenever said test of casein demand is mentioned.

This is the uncalcined starting material which has been used for at least twelve years to make "Whitetex" by calcining and pulverizing as later described herein.

The average properties of the entire, calcined "Whitetex" powder are substantially as follows:

TABLE NO. 2.—"WHITETEX" POWDER

Particle size: 62% by weight has a particle size below two microns.
"GE" value: 90 to 91.
Abrasion value: 500 to 700.
Clay-water viscosity: "N.C." at 70% solids, indicating high viscosity.
Casein demand: 25 to 35 parts by weight of casein, per 100 parts of said "Whitetex."

Hence, even though the high-abrasion, calcined clumps which are made by calcining said commercial filler clay are pulverized as strongly as possible in a commercial hammer mill, only 62% by weight of the entire calcined "Whitetex" powder has a particle size below two microns. Abrasion value, clay-water viscosity and adhesive demand are greatly increased.

*Method No. I*

In one method of treating the entire high-abrasion, calcined "Whitetex" powder of Table No. 2, said entire calcined powder is milled or otherwise frictionally worked until its clay-water viscosity may be substantially 15 seconds at 70% solids. This can be done by either dry or wet milling. This also reduces adhesive demand. The optional and preferred wet-milling method is later described.

A fine-particle, low-abrasion, calcined clay fraction is separated from said entire high-abrasion calcined "Whitetex" powder after it has been milled, either by said Maloney process or by any other process.

In this low abrasion fraction, 80% or more by weight of the particles have a particle size below two microns.

In an alternative method, such low-abrasion, fine-particle, calcined clay fraction is separated from the unmilled, high-abrasion calcined "Whitetex" by the Maloney process or by any other process. This fine-particle, calcined clay fraction may be used in the unmilled or milled form, depending upon the intended use thereof. In an unmilled, fine-particle, low-abrasion calcined clay fraction, the particle size and "GE" value and abrasion value are substantially the same as in the following Table No. 3, which refers to a milled, low-abrasion, calcined fine-particle clay fraction.

That is, as above mentioned, the milled and unmilled, low-abrasive, calcined, clay powders have substantially the same "GE" value, and substantially the same abrasion value and substantially the same average particle size. The essential effect of milling is optionally to exert only some surface effect, which reduces only clay-water viscosity and adhesive demand.

If milled before or after separation from said "Whitetex" powder, the average properties of said fine-particle, low-abrasion, calcined milled clay fraction are substantially as follows:

TABLE NO. 3.—MILLED, LOW-ABRASION, FINE-PARTICLE CALCINED CLAY OR KAOLIN FRACTION SEPARATED FROM THE "WHITETEX" OF TABLE NO. 2

Particle size: At least 80% by weight of the particles have a size below two microns. In general, it is preferred to provide a low-abrasion, calcined clay or kaolin powder in which 80% or more by weight of the particles have a size below two microns, subject to the qualifications that this particle size may be up to 2.2 microns.
GE value: 91 to 93.
Abrasion value: 160 to 200.
Clay-water viscosity: 15 seconds at 70% solids.
Casein demand: 12 to 16 parts by weight of casein per 100 parts of said milled, low-abrasion, fine-particle, calcined kaolin.

As another starting material, I can use a grade of uncalcined, purified clay or kaolin which has been and is known commercially as "coating clay" in the paper industry. This coating clay has been and is extensively used as a mineral pigment in coating paper. This commercial coating clay has substantially 80% of its particles of a size below two microns or up to 2.2 microns. This commercial coating clay is described in said Maloney U. S. Patent No. 2,158,957, dated May 16, 1939. It can be produced by any other process.

The average properties of this uncalcined, commercial, coating clay powder are substantially as follows:

TABLE NO. 4.—UNCALCINED COATING CLAY POWDER

Particle size: 80% by weight of the particles have a size below two microns.
"GE" value: 84 to 85.5.
Abrasion value: 10 to 15.
Clay-water viscosity: 15 seconds at 70% solids.
Casein demand: 10 to 12 parts by weight of casein per 100 parts of said coating clay.

If this commercial coating clay powder is calcined and then pulverized as later described, the average properties of the entire, resultant, calcined, high-abrasion powder are substantially as follows:

TABLE NO. 5.—ENTIRE HIGH-ABRASION, CALCINED POWDER MADE FROM COMMERCIAL COATING CLAY

Particle size: 72% by weight of the particles have a size below two microns.
"GE" value: 91 to 93.
Abrasion value: 300 to 500.
Clay-water viscosity: "N.C." at 70% solids.

Casein demand: 25 to 35 parts by weight of casein per 100 parts of said calcined powder.

The unmilled powder of Table No. 5 can be fractionated by the Maloney process or any other process to separate a low-abrasion, fine-particle, unmilled calcined clay fraction, which has a low-abrasion value of 160 to 200 and a "GE" value of 91 to 93. This unmilled, low-abrasion calcined clay fraction has 80% by weight of its particles below two microns in size. This fraction may be used in the unmilled form or it may be milled, depending on its proposed use.

Alternatively, the entire high-abrasion calcined powder of Table No. 5 may be milled until its clay-water viscosity is 15 seconds at 70% solids, and a low-abrasion, fine-particle, calcined clay fraction can then be separated from said previously milled powder by the Maloney process or by any other process.

As in the previous case, the milling may be wet or dry, and the milling may not materially change average particle size, brightness and whiteness, and abrasion value. The essential effect of milling, as in the previous case, may be to lower clay-water viscosity and adhesive demand, although the amount of fine particles is somewhat increased.

If this low-abrasion, fine-particle, calcined clay fraction is milled after separation from the entire powder of Table No. 5, or if it is separated from the entire high-abrasion, calcined clay powder of Table No. 5 after said powder has been milled, its average properties are substantially as follows:

TABLE NO. 6.—MILLED, LOW-ABRASION, FINE-PARTICLE FRACTION OF HIGH ABRASION POWDER OF TABLE NO. 5

Particle size: 80% by weight of the particles have a size below two microns.
"GE" value: 91 to 93.
Abrasion value: 160 to 200.
Clay-water viscosity: 15 seconds at 70% solids.
Casein demand: 12 to 16 parts by weight of casein per 100 parts of said fine-particle fraction.

As stated in Table No. 4, the casein demand of uncalcined coating clay powder is 10 to 12 parts of casein, per 100 parts of said coating clay.

The casein demand of the fine-particle, low abrasion calcined fraction of Table No. 6 may in some cases, be substantially equal to the casein demand of said uncalcined coating clay. The maximum casein demand of the fine-particle, milled, calcined fraction of Table No. 6 is substantially 133% of the maximum casein demand of said uncalcined coating clay.

As another example, I use a starting material which is a very fine, purified, uncalcined clay or kaolin, in which 90% or more by weight of the particles, such as 96% by weight, have a particle size below two microns. As one specific example, substantially 96% by weight of this uncalcined, purified, starting material has a particle size below two microns. This very fine grade can be prepared by using said Maloney process or by using any other process.

If the uncalcined, starting powdered kaolin material has 96% by weight of a particle size below two microns, its average properties are substantially as follows:

TABLE NO. 7.—UNCALCINED STARTING POWDERED MATERIAL, 96% BY WEIGHT OF ITS PARTICLES HAVING A SIZE BELOW TWO MICRONS

Particle size: As above specified.
"GE" value: 85.5 to 87.
Abrasion value: Zero to 8.
Clay-water viscosity: 15 seconds at 70% solids.
Casein demand: 10 to 12 parts by weight of casein per 100 parts of said clay.

When this uncalcined powder of Table No. 7 is calcined and pulverized as later described, the entire, unmilled, calcined, low-abrasion powder has average properties substantially as follows:

TABLE NO. 8—ENTIRE, UNMILLED, CALCINED POWDER MADE FROM THE POWDER OF TABLE NO. 7

Particle size: 90% by weight of the particles have a size below two microns.
"GE" value: 93.
Abrasion value: 100 to 150.
Clay-water viscosity: "N.C." at 70% solids.
Casein demand: 25 to 35 parts by weight of casein per 100 parts of said calcined powder.

Hence, this entire unmilled calcined powder can be used as a filler in making paper and for many other purposes.

This entire, unmilled, low-abrasion calcined powder of Table No. 8 can be milled, dry or wet, until its clay-water viscosity may be 15 seconds at 70% solids, as in previous milling operations. As in previous milling operations, the milling need not substantially change average particle size, "GE" value, or abrasion, although the amount of fine particles is somewhat increased. The milling does lower clay-water viscosity and adhesive demand.

The average properties of such entire, unfractionated, milled, calcined powder are substantially as follows:

TABLE NO. 9.—POWDER MADE BY MILLING THE POWDER OF TABLE NO. 8

Particle size: 90% by weight of the particles have a size below two microns.
"GE" value: 93.
Abrasion value: 100 to 150.
Clay-water viscosity: 15 seconds at 70% solids.
Casein demand: 12 to 16 parts by weight of casein per 100 parts of said clay.

The casein demand is substantially the same as in Table No. 6. Hence by using a starting, uncalcined clay or kaolin powder of sufficiently small particle size, and if said starting powder is substantially free from abrasive impurities, I eliminate fractionation of the resultant calcined powder.

By using a starting material in which more than 96% by weight has a particle size below two microns, or by separating a fine-particle calcined fraction from the unmilled calcined powder of Table No. 8 or the milled calcined powder of Table No. 8, an abrasion value even below 100 can be secured, as low as substantially zero.

*Comparison of abrasiveness of the improved low-abrasion powders, either milled or unmilled with other materials*

When abrasiveness is tested by the method used herein, the abrasive value of certain well-known materials is as follows:

Material: Abrasive value
(A) Calcium silicate; precipitated, hydrated, technical grade _____ 370
(B) "Silene EF" _____ 18 to 21
(C) "Dicalite" _____ 218
(D) Ground mica _____ 218
(E) Blanc fixe, pigment grade _____ 38
(F) Satin white, pigment grade _____ 43
(G) Lithopone _____ 23
(H) Titanium dioxide powder, technical grade, (previously mentioned) _____ 38 to 40
(I) Asbestine _____ 517
(J) Calcium carbonate, fine particle, precipitated _____ 37.5

Hence, a maximum abrasion value of 200 is about the same as the abrasion value of "Dicalite" or the abrasion value of ground mica; and about five times the abrasion value of said titanium dioxide powder. Said "Dicalite" corresponds to the technical grade of diatomaceous earth or kieselguhr which is used as a mild scouring agent.

Said maximum abrasion value of 200 is substantially 5.7 times to 10 times the abrasive value of said uncalcined, commercial filler clay which is used in the paper industry; and substantially 13 times to 20 times the abrasion value of said uncalcined, commercial coating clay which is used in the paper industry. These comparisons of abrasive value substantially apply, irrespective of the specific method used to determine specific abrasion value.

The "Silene EF" is described in page 515 of the 1953 edition of "Handbook of Material Trade Names," by Zimmerman and Lavine, published by Industrial Research Service.

It is a mineral pigment which is a soft, highly-absorptive, white, finely-divided, hydrated calcium silicate. Its approximate analysis is CaO, 19%, $SiO_2$, 67%; loss on ignition, 14%; specific gravity, 2.10; bulk density, 15 to 16 pounds per cubic foot.

The "Dicalite" is described in page 171 of said "Handbook of Material Trade Names." It is diatomaceous silica, $SiO_2$. Its bulk density is 7 to 10 pounds per cubic foot. In the particular specimen tested, the bulk density of the "Dicalite" was approximately 10.6 pounds per cubic foot.

"Asbestine" is described in page 66 of said "Handbook of Material Trade Names." It is a natural, pure-white, fibrous magnesium silicate, 99% of which passes through a 325 mesh screen. Since a No. 325 sieve has a sieve opening of 0.044 millimeter, substantially all of this material has a particle size less than 44 microns.

"Blanc fixe" is described in page 87 of said "Handbook of Material Trade Names." It is precipitated barium sulfate, which has a specific gravity of 4.476.

"Satin White" (calcium sulfate) is described in page 155 of the 1942 edition of "The Condensed Chemical Dictionary," published by Reinhold Publishing Corporation. Its technical grade, which has been used in the test, is a well-known pigment.

In each of these abrasiveness tests by the well-known "Valley" apparatus, which was used as later described, an aqueous, undeflocculated slurry was made of 108.5 grams of the respective material and 641.5 grams of water, so that the aqueous slurry had a total weight of 750 grams, with a solids content of substantially 14.4% of total weight. This slurry was constantly agitated by the pump of said "Valley" apparatus.

*Viscosity tests*

In making the viscosity tests mentioned herein in order to determine clay-water viscosity, an aqueous alkaline dispersing or deflocculating solution was made by dissolving one part by weight of the technical grade of sodium tripolyphosphate in 129 parts of water. The formula of this alkali is $Na_5P_3O_{10}$. This alkali is described in page 580 of "Handbook of Chemistry and Physics," 34th edition, published by Chemical Rubber Publishing Company. It is also described in page 1015 of the 1956 edition of "The Condensed Chemical Dictionary," published by Reinhold Publishing Corporation.

Seventy parts by weight of the respective clay were mixed with thirty parts of said solution, to form a deflocculated suspension of the respective clay. This aqueous suspension was tested by the "Stormer" viscosimeter.

*Frictionally working or milling the unmilled, calcined powder*

This can be done in the dry state of the respective unmilled, calcined low-abrasion or high-abrasion powder, or said calcined powder may be milled in a clay-water slurry in which the respective calcined, unmilled, low-abrasion or high-abrasion clay powder is not deflocculated; or highly preferably, in an aqueous slurry in which the respective calcined, unmilled low-abrasion or high-abrasion calcined clay powder is kept deflocculated during the milling.

When the calcined, unmilled, low-abrasion or high-abrasion calcined clay powder is milled or worked in deflocculated form in an aqueous slurry, said aqueous slurry may have a pH of 7 to 10, due to dissolved dispersing alkali.

As one example, such deflocculated, aqueous slurry may have 25 parts of the unmilled, calcined low-abrasion or high-abrasion calcined clay powder (dry weight) and 75 parts by weight of water in which the alkaline dispersing or deflocculating agent is dissolved.

As other examples, said alkaline deflocculated slurry may have 40 parts of said alkaline deflocculating solution by weight and 60 parts of deflocculated, unmilled, low-abrasion or high-abrasion calcined clay or kaolin powder; or 45 parts of said alkaline deflocculating solution and 55 parts of said deflocculated, calcined, unmilled low-abrasion or high-abrasion clay or kaolin powder.

Any mill can be used to mill the dry, calcined, low-abrasion or high-abrasion calcined clay or kaolin powder.

The aqueous slurry in which the calcined, low-abrasion or high-abrasion clay powder is not deflocculated, or the alkaline aqueous slurry in which the calcined, low-abrasion or high-abrasion clay powder is deflocculated, can be frictionally worked in any mill, or in what is known in the trade as a high-shear mixer, in which the slurry is strongly agitated and rubbed by a rapidly revolving agitator which is operated under considerable force, in order to apply a rubbing action to the undeflocculated or deflocculated kaolin or clay particles.

The preferred and optional mill uses cylinders of "Burundum."

This mill has a metal drum or cylinder which has an internal ceramic liner of hard burned porcelain, which is rotated about a horizontal axis at 36 revolutions per minute. This rotatable cylinder, in addition to the filling of the low abrasion or high-abrasion calcined kaolin, has 400 pounds of "Burundum" cylinders. Two hundred pounds of these cylinders have a length of 13/16 inch and a diameter of 13/16 inch. The other 200 pounds have a length of 1.25 inch and a diameter of 1.25 inch.

The total volume of said cylinders is 66 U.S. gallons.

This "Burundum" is described in pages 33 and 34 of Supplement No. I to the 1953 edition of "Handbook of Material Trade Names," published by Industrial Research Service Inc. It consists of ultra-fired ceramic material which has a hardness of 9 in the Mohs scale. Balls of said "Burundum" material may be used, instead of cylinders.

In the preferred method, one hundred pounds of the dry, calcined, unmilled, low-abrasion or high-abrasion clay or kaolin powder are put into this lined drum, together with about three-tenths percent by weight of said dry sodium tri-poly-phosphate, namely, substantially one hundred and thirty-five (135) grams of said dry alkali. Instead of using this alkali, I can use the same ratio of tetrasodium pyrophosphate, $Na_4P_2O_7$.

Enough water is put into the drum to produce a deflocculated slurry, which in addition to the dissolved alkali, has 40 parts to 45 parts by weight of water, so that the slurry of deflocculated clay or kaolin particles has from 60 to 55 parts of the unmilled, calcined low-abrasion or high-abrasion clay or kaolin. Said calcined clay or kaolin remains in finely divided or deflocculated form in this aqueous alkaline slurry, during the frictional or rubbing or milling action. This alkaline slurry may have a pH of 7 to 10, at 20° C.–30° C. The drum is rotated about its axis, at the above mentioned rate of thirty-six revolutions per minute, during a period of twelve to twenty-four hours, in an atmosphere which may have a normal temperature of 20° C.–30° C., subject to heating to 34° C. by the mechanical action, and under normal atmospheric pressure of 760 millimeters of mercury.

At the end of said working period, the worked, deflocculated slurry is discharged from the mill. The discharged, deflocculated slurry is then acidified to a pH of 4.0 to 4.5 by dissolving alum or other acid agent therein, in order to flocculate the calcined milled clay, and the frictionally worked, flocculated, calcined clay or kaolin powder is collected in dry powder form from the acidified slurry, as above described, or by any other collection method.

The invention is not limited to the above example, because the ratio between the dry weight of the low-abrasion, or high-abrasion unmilled, calcined, clay or kaolin powder and the weight of the cylinders may be changed. Also, the cylinders may be of various sizes and types.

In general, but without limitation thereto, the dry weight of the unmilled, calcined, low-abrasion or high-abrasion clay or kaolin powder is preferably substantially twelve percent to twenty-five percent of the weight of the milling balls or cylinders. This ratio is an important factor, in order to frictionally work said low-abrasion, unmilled, calcined clay or kaolin powder, without substantially changing its original average particle size, although the amount of fine particles is somewhat increased, and without substantially changing the original shape of its particles of clay or kaolin, its original brightness and whiteness and covering power, and its original abrasiveness and wetting power.

If other types of mills are used, they can be adjusted to secure the desired frictional effects, without optionally substantially changing said original properties of the unmilled, calcined kaolin powder in the shape and average size of the particles save for some increase in the amount of fine particles, and without substantially changing the original abrasion, brightness and whiteness, covering power and wetting power.

*The "Valley" apparatus testing for abrasiveness*

The "Valley" apparatus for use in this testing method is well known and is extensively used and is described in trade catalogues, and a method of using said "Valley" apparatus for testing abrasive value has been approved by The Institute of Paper Chemistry. I use a variation of said approved method. The abrasion index which is determined by the method which is approved by The Institute of Paper Chemistry, is about 50% to 60% of the abrasive index which is determined by the method which I use. Hence, when I report an abrasion index of 200 by the method used herein, this abrasion value or index is 100 to 120 by said approved or official method. However, the comparison of relative abrasiveness is the same in my method as in said approved method.

This "Valley" apparatus utilizes a tank, and also uses mesh wire cloth which is made of Phosphor bronze, and also uses a "Micarta" block.

The machine is thoroughly cleaned and then flushed with clear water.

The Phosphor bronze woven wire cloth is cut to a test piece of rectangular form, with a length of $8^{13}/_{16}$ inch and a width of $3^{7}/_{16}$ inch. This test piece is washed with soap and water, dried, cooled to 20° C.–30° C. and accurately weighed. Its openings are No. 60 sieve, with openings whose size is 0.250 millimeter or 0.0098 inch. The warp wires of this test piece have a thickness of 0.0092 inch. The filler wires of this test piece have a thickness of 0.010 inch. The total thickness of this test piece of wire mesh is a thickness of about 0.024 inch.

108.5 grams of the clay or other test material whose abrasiveness is to be tested, in fine powder form, are mixed with 604.5 grams of water. The mixture of water and fine particles is passed into the tank through a No. 80 sieve, whose sieve opening is 0.177 millimeter or 0.0070 inch, while the valve at the bottom of the tank is closed. The test piece of wire cloth is then clamped into position.

The weighted "Micarta" block is placed in its frame. The block is connected to a driving rod. The frame remains stationary. The weighted "Micarta" block rests on the top of the test piece of wire cloth.

The "Micarta" is a well-known molded material, which is made from fabric or paper which is impregnated with phenol-formaldehyde thermosetting resin, and is then compressed under heat in order to set the resin.

According to the standards of the Institute of Paper Chemistry, the weight of this weighted "Micarta" block is 17.2 pounds to 17.5 pounds. This includes the "Micarta" block, and a lead weight. In the tests used herein, the total weight of the "Micarta" weighted block was 18 pounds. This "Micarta" is known as "Canvas Base—Westinghouse No. G–270."

The "Valley" machine is then operated to pump the clay-water slurry or other test aqueous slurry continuously, in a single direction, around the "Micarta" block and the wire cloth, while the "Micarta" block is continuously reciprocated in six thousand complete reciprocations or double strokes. The "Micarta" block thus applies the particles of the test slurry frictionally to the Phosphor bronze wire cloth.

The wire cloth is then removed, washed, dried and weighed. The loss of weight of the wire cloth in milligrams is the abrasion index or value of the respective material. Thus, if the loss of weight of the piece of wire cloth is sixty milligrams, the abrasion value or erosion factor of the tested slurry is designated as "sixty" or as "sixty milligrams."

In this abrasion test, the kaolin or other material is not usually deflocculated, but it may be deflocculated. The tested material forms a uniform powder mixture with the water during the test.

*Calcination*

At about 150° C., the uncalcined clay or kaolin powder which I use as starting material in my method, substantially free from abrasive impurities, is dried by driving off its mechanical or hygroscopic water. The chemically combined water is driven off at 400° C. to 600° C. An exothermic reaction can be easily observed, usually at about 721° C. to 980° C. During the short period of this exothermic reaction, the temperature of the clay or kaolin will rise during a short period, a few degrees above the temperature of the respective heating zone, and when the exothermic reaction has been completed, the temperature of the clay or kaolin will drop to the temperature of said heating zone.

As above noted, the specific calcination temperatures which I use, depend to some extent upon the respective purified clay or kaolin, and this example applies specifically to Georgia kaolin, and there may be routine variations in using other kaolins, during the calcination, and also in all other steps of the entire process described herein.

Calcination is to be distinguished from heating to dry the clay or kaolin, or eliminating its chemically bound water.

In general, I calcine the clay or kaolin in a temperature range of 980° C. to 1038° C.

Prior to heating the respective, uncalcined, purified clay or kaolin to drive off its mechanical and hydroscopic water, the respective dry, uncalcined kaolin powder of the grades previously described, or of other grades, may be pulverized in a hammer mill to break up any aggregates and to produce a free-flowing, dry kaolin powder, which has the fineness which can be secured by pulverization in a hammer mill. The dry clay or kaolin powder remains a free-flowing powder throughout the calcination.

For the purposes herein, this uncalcined starting material is considered as having the same particle size as in its cleaned, deflocculated form in the respective cleaned slurry. Thus, if the cleaned slurry had, in deflocculated form, clay in which 70% by weight had a particle size below two microns, the corresponding collected dry powder which is calcined, is also defined as having 70% by weight of a particle size below two microns, even though said collected powder has aggregates of particles of such particle size.

As one example, the respective purified, uncalcined kaolin powder of any of the particle-size grades mentioned herein or of other particle size, is heated in seven successive and superposed zones or hearths in any well-known apparatus, such as the well-known Nichols-Herreshoff calcination furnace. The kaolin powder is flowed continuously through the furnace and it is continuously stirred in each heating zone or hearth. The heating period in each of said seven zones or hearths is 7–10 minutes. That is, each particle remains in each zone from seven to ten minutes.

HEATING ZONE NO. 1

The kaolin is heated to 720 degrees Fahrenheit to 880 degrees Fahrenheit, which corresponds substantially to 382° C.–471° C. In this example, the mechanical and hygroscopic water of the kaolin are eliminated in this zone, but the chemically bound water is not removed, or is only partially removed.

HEATING ZONE NO. 2

The kaolin is heated to 1020 degrees Fahrenheit to 1140 degrees Fahrenheit, which corresponds substantially to 549° C.–615° C. This preheating removes a part of the chemically-bound water.

HEATING ZONE NO. 3

The heating of the kaolin is continued in a temperature range of 1100 degrees Fahrenheit to 1330 degrees Fahrenheit, which corresponds substantially to 593° C.–721° C. All the chemically-bound water is removed, and the clay or kaolin powder is prepared for the exothermic reaction and the calcination in the succeeding zones or hearths.

HEATING ZONE NO. 4

This is the first essential calcining step. The clay or kaolin powder is heated to 1850 degrees Fahrenheit to 1900° Fahrenheit, which corresponds substantially to 1010° C.–1037° C.

When the clay or kaolin is heated above 721° C. to suitable temperature, the exothermic reaction begins. This exothermic reaction may begin at 1795 degrees Fahrenheit or 980° C. Since this exothermic reaction can easily be observed, the heating in this hearth can be controlled, so that the effect is limited or substantially limited to said exothermic reaction. The clay or kaolin is not vitrified or fused in my process. There is no substantial production of mullite. Depending upon the clay or kaolin, this exothermic reaction may start above 980° C. The exothermic reaction may be wholly or partly completed in this zone.

HEATING ZONE NO. 5

The clay or kaolin is kept at 1570 degrees Fahrenheit to 1660 degrees Fahrenheit, corresponding to 854° C.–904° C. The exothermic reaction may be continued in some cases, at a lower temperature than in the preceding zone. This tends to supply heat to the next upper zone 4. As above noted, kaolin is a variable natural product, and the results and procedures may vary to some extent.

HEATING ZONE NO. 6

The clay or kaolin is kept at 1850 degrees Fahrenheit to 1900 degrees Fahrenheit, corresponding to 1010° C.–1037° C. If the exothermic reaction has not previously been completed, it is completed in this zone.

HEATING ZONE NO. 7

The clay or kaolin is kept at 1550 degrees Fahrenheit to 1700 degrees Fahrenheit, corresponding to 843° C.–926° C. The clay or kaolin powder is thus cooled below the temperature at which the exothermic reaction takes place. The hot gases rise to zone No. 6, thus supplying heat thereto.

The clay or kaolin is fed continuously from heating zone No. 1 through heating zones 2–7 inclusive, although each particle clump or calcined clump or calcined aggregate remains in each heating zone during a selected period of 7 to 10 minutes.

The final abrasive calcined clumps or aggregates which result from the calcination, are discharged from final Heating Zone No. 7, at 843° C.–926° C., upon a traveling conveyor which is freely exposed to the air. The calcined clumps or calcined aggregates are fed into and pulverized in a hammer mill, in which the resultant calcined powder is cooled to 20° C.–30° C. The hammer mill may initially operate upon said hot calcined clumps or aggregates, directly after they have been discharged from Heating Zone No. 7, or said discharged calcined clumps or aggregates may be cooled to 20° C.–30° C., prior to being pulverized. Preferably, the discharged calcined clumps are cooled to 30° C., and are then fed into the hammer mill at that temperature, and said calcined clumps are pulverized into final powder form in the hammer mill at low temperature.

Determining particle size of uncalcined and calcined powders

Various sedimentation methods are known in the clay industry for measuring approximate particle size. These sedimentation methods give results expresed in terms of "equivalent spherical diameter," namely, the diameter of a sphere having the same specific gravity as the particle under test, said sphere settling in water at the same rate as the clay or kaolin particle under test. The particle sizes of the calcined and uncalcined powder mentioned in this disclosure are determined by such sedimentation method and are stated in terms of said "equivalent spherical diameter."

These particle sizes of the uncalcined and calcined kaolin powders may be determined by using the sedimentation method stated in a printed publication issued in November 1954, by the Technical Association of the Pulp and Paper Industry. This publication is identified as "T649SM–54" and is entitled, "Particle-Size Distribution of Coating Clay."

This publication refers to the use of the Bouyoucos hydrometer, which is disclosed in "Soil Science," vol. 76, pages 377–378, published in 1953, and said publication also refers to the use of said hydrometer in accordance with the Casagrande method, which is disclosed in said publication. Determination of particle size is also subject to experimental variation as above stated, so that a variation of plus or minus ten percent in each figure of particle size stated herein, is within the scope of the invention, and also within the scope of the results of using different clays or kaolins.

The various sedimentation methods used in the clay industry for determining particle size agree generally for commercial purposes, subject to a variation of plus ten percent or minus ten percent.

Thus, if one method reports a particle size of two microns, other methods may report a particle size of 2.2 microns to 1.8 microns.

Hence the particle size measurements reported herein are subject to such variation, which may result from experimental variation in the same method, or different results of different methods.

In general, my invention includes each of the following:

(a) A calcined kaolin powder which, irrespective of other properties, has an abrasion value in a range from zero to 200 or substantially 200, as determined herein.

(b) A calcined kaolin powder which has an abrasion value of zero to 200 or substantially 200, as determined herein, and a minimum "GE" value of substantially 90, irrespective of other properties.

(c) A calcined kaolin powder which has an abrasion value of zero to 200 or substantially 200 as determined herein, at least substantially 80% by weight of said powder having a particle size below two microns, irrespective of other properties.

(d) Calcined clay powder which has a maximum clay-water viscosity of 15 to 18 seconds at 70% solids, irrespective of the other properties, or which has a casein demand which is a maximum of substantially 133% of the casein demand of commercial coating clay, irrespective of other properties.

(e) An improved paper which has a calcined clay filler in sufficient ratio to have superior whiteness and opacity, in comparison with the same paper having the same ratio of commercial filler clay, said calcined clay filler having an abrasion value of zero up to a maximum of 200 or substantially 200 as determined herein.

(f) An improved coated paper which has a mineral coating which has any ratio of a calcined clay powder as a mineral coating pigment, said pigment powder having a minimum "GE" value of substantially 90, said powder having an abrasive value of zero to 200 or substantially 200 as determined herein.

(g) Fractionating from any any large-particle, high-abrasion calcined kaolin powder which has an abrasion value above 200 or substantially 200, as determined herein, a low-abrasion calcined fraction which has at least 80% or more by weight of a particle size below two microns and a maximum abrasion value of 200 or substantially 200, said calcined fraction being either milled or unmilled, so that said low-abrasion, calcined powder fraction may have either low or high clay-water viscosity, and may have either low or high adhesive demand.

(h) Calcining a low-abrasion uncalcined kaolin powder in which at least substantially 90% by weight has a maximum particle size of two microns; pulverizing the resultant clumps to produce a low-abrasion, calcined powder whose maximum abrasion is 200 or substantially 200 as determined herein, with or without milling said low-abrasion, calcined powder.

(i) Frictionally working or milling either a high-abrasion or low-abrasion, calcined clay powder as defined herein, by either wet milling or dry milling, to lower the clay-water viscosity or the adhesive demand or to lower both clay-water viscosity and adhesive demand of said high-abrasion or low-abrasion, calcined clay powder, with or without changing the other properties of the unmilled said high-abasion or low-abrasion calcined clay powder which is thus subjected to said frictional working or milling.

The scope of the invention and further disclosure of the invention are stated in the appended claims, which are part of the subject-matter of the disclosure herein.

I claim:

1. A calcined kaolin powder whose abrasive value is in a range of 0 to 200 as determined by the "Valley" method, the minimum brightness and whiteness of said powder being substantially 90% of the brightness and whiteness of magnesium oxide as determined by the "GE" test, having substantially at least 80% by weight of said powder having a maximum particle size of substantially 2 microns as determined by the sedimentation method.

2. A calcined kaolin powder according to claim 1 said minimum brightness and whiteness being substantially 93%.

3. A calcined kaolin powder whose abrasive value is in a range of 0 to 150 as determined by the "Valley" method, the minimum brightness and whiteness of said powder being substantially 93% of the brightness and whiteness of magnesium oxide as determined by the "GE" test, at least substantially 90% by weight of said powder having a maximum particle size of substantially 2.0 microns as determined by the sedimentation method.

4. In the production of paper wherein a filler is included in the paper, the improvement which comprises employing as filler a calcined kaolin powder whose abrasive value is in a range of 0 to 200 as determined by the "Valley" method, the minimum brightness and whiteness of said powder being of substantially 90% of the brightness and whiteness of magnesium oxide as determined by the "GE" test, at least substantially 80% by weight of said powder having a maximum particle size of substantially 2 microns as determined by the sedimentation method.

5. In the production of paper wherein a mineral coating is applied to the paper, the improvement which comprises employing as mineral coating a calcined kaolin powder whose abrasive value is in a range of 0 to 200 as determined by the "Valley" method, the minimum brightness and whiteness of said powder being of substantially 90% of the brightness and whiteness of magnesium oxide as determined by the "GE" test, at least substantially 80% by weight of said powder having a maximum particle size of substantially 2.0 microns as determined by the sedimentation method.

References Cited in the file of this patent

UNITED STATES PATENTS

| | | |
|---|---|---|
| 1,830,934 | Curtis | Nov. 10, 1931 |
| 1,841,309 | Vanderbilt | Jan. 12, 1932 |
| 2,041,721 | Norton | May 26, 1936 |
| 2,164,500 | Cummins | July 4, 1939 |
| 2,297,539 | Diamond | Sept. 29, 1942 |
| 2,307,239 | Rowland | Jan. 5, 1943 |
| 2,339,595 | Williams et al. | Jan. 18, 1944 |
| 2,388,060 | Hicks | Oct. 30, 1945 |
| 2,524,816 | Lyons | Oct. 10, 1950 |
| 2,772,981 | Smart | Dec. 4, 1956 |
| 2,801,183 | Kantzer | July 30, 1957 |
| 2,900,266 | Shaver | Aug. 18, 1959 |

OTHER REFERENCES

Mellor: Compr. Treatise on Inorg. and Theo. Chem., vol. 6C, part 2.